Oct. 13, 1970     K. A. GEBLER ET AL     3,534,131
UTILIZING A GRAPHITE PARTING LAYER TO SEPARATE REFRACTORY
ARTICLES DURING SINTERING
Filed Oct. 16, 1968

INVENTORS
KENNETH A. GEBLER
MARTIN H. ORTNER

BY

ATTORNEY 3,534,131
METHOD OF UTILIZING A GRAPHITE PARTING LAYER TO SEPARATE REFRACTORY ARTICLES DURING SINTERING
Kenneth A. Gebler, Dover, and Martin H. Ortner, Kinnelon, N.J., assignors, by mesne assignments, to the United States of America as represented by the Secretary of the Navy
Filed Oct. 16, 1968, Ser. No. 768,094
Int. Cl. C04b *33/32, 35/64*
U.S. Cl. 264—59          5 Claims

ABSTRACT OF THE DISCLOSURE

A graphite parting layer is applied to the surface of a refractory form. A refractory ceramic material is applied over the parting layer by electrophoretic deposition. The composite is then heated in a wet hydrogen atmosphere to the sintering temperature of the refractory ceramic material. The hydrogen reacts with the graphite parting layer completely eliminating it by transforming the graphite to hydrocarbon gases. This allows the refractory ceramic material to sinter and freely shrink to a free standing entity.

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION

Field of the invention

The present invention relates to a process of making ceramic shells, other thin walled articles and ceramic products of high density and high strength. More particularly, the invention relates to a method for removing the products from the forms upon which they are cured.

Description of the prior art

It has been known in the prior art to form thin walled articles by dipping, spraying or electrophoretically depositing ceramic or other material on the surfaces of a form and then to place the coated form in a furnace to sinter the ceramic or other material until it becomes a dense and impervious free-standing entity.

It is also known in the prior art to place a parting layer between the form and the layer of ceramic or other material. The parting layer is softened or disintegrated by the heat of the furnace thereby freeing the ceramic article from the form. Other prior art arrangements include the step of applying a destructive atmosphere or gas to the parting layer after the curing of the ceramic article in the furnace. However, with these arrangements the removal of the parting layer is an additional step and involves extra time and extra handling of the ceramic.

From the standpoint of saving time and eliminating excessive handling of the thin walled structure, the prior art arrangements wherein the parting layer is disintegrated or softened by the heat of the furnace during sintering of the article are preferable over prior art arrangements wherein a solvent is applied as a separate step to remove the parting layer. However, when heat is used to affect the parting layer (e.g., by softening it or by softening a bonding material which holds the material of the parting layer together) the material which makes up the parting layer remains intact and is not destroyed. At the very high temperatures to which ceramic structures are subjected for sintering there is a danger that the residue of the parting material will react with or fuse to either the form or the ceramic structure.

Furthermore, in order to obtain extremely thin walled articles of ceramics or other material, it is necessary to obtain a uniform thin coherent and adherent deposit of the material on the parting layer coated form. One of the best ways to obtain such a deposit is by electrophoretic deposition. In order to electrophoretically deposit the material on the parting layer, it is necessary to apply an electrical charge to the parting layer and thus the parting layer must be made of an electrically conductive material. It is difficult to find electrically conductive material which can be softened or disintegrated by the application of heat and still not have harmful effects either on the form or on the article being formed.

SUMMARY OF THE INVENTION

Applicants have overcome the above problems by providing a parting layer made of graphite and by firing the ceramic article in an atmosphere of wet hydrogen which reacts with the graphite to form volatile hydrocarbons thereby completely eliminating the electrically conductive parting layer.

An object of the present invention is the provision of a process which will produce very thin walled articles.

Another object of the present invention is to provide a parting layer which will react with the atmosphere in which a thin walled article is sintered to effectively separate the article from the form upon which it was deposited.

A further object of the present invention is the provision of a parting layer which will be completely eliminated during the sintering of the article.

Still another object of the present invention is to provide a parting layer which can be used in electrophoretic deposition of ceramic or other material.

A still further object of the present invention is to provide a parting layer which can be used in electrophoretically depositing a ceramic or other material and which will be completely eliminated during firing of the ceramic to maturity.

Yet another object of the present invention is the provision of an electrically conductive parting layer.

Other objects, advantages and novel features of the present invention will become apparent from the following detailed description of the invention when considered in conjunction with the accompanying drawings.

DESCRIPTION OF THE PREFERRED EMBODIMENT

Figure 1:
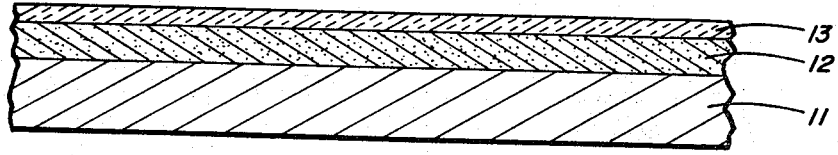
FIG. 1 shows an end view of a form, parting layer and ceramic layer used to create a flat ceramic sheet.
Figure 2:
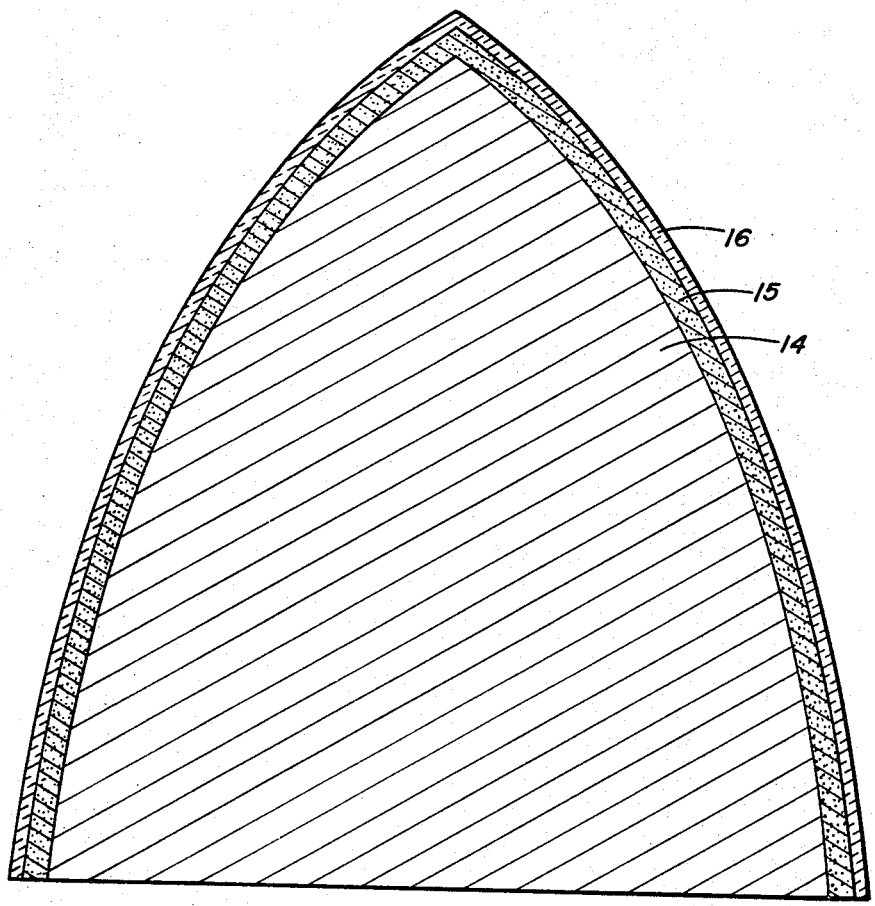
FIG. 2 is a cross-section through a form having thereon a parting layer and layer of ceramic, the form being shaped to create a radome.

FIG. 1 shows a refractory form or substrate 11 upon which is applied a parting layer 12. A refractory material 13 is applied over the parting layer 12. FIG. 2 is an example of how a shaped thin walled structure such as a radome can be formed. Form 14 is coated with parting layer 15. Over this is applied layer 16 of ceramic or other material.

In both of these examples the form 11, 14 is usually but not necessarily a metal. It must be of a material which is non-reactive with the parting layer and it must be more refractory than the ceramic or other material 13, 16. The parting layer 12, 15 must be chosen from materials which will not react with the form or with the ceramic or other material. It also must react with the reducing atmosphere in which the article is fired to form gases. If the layers 13 and 16 are to be applied by electrophoretic deposition, the parting layer 12, 15 must be electrically conductive. The material which is to form the final article 13, 16 must be non-reactive with the parting layer and the form and less refractory than the form so that the article can be fired to maturity (high density and high imperviousness) without harm to the substrate. Any materials which meet the above criteria can be used for the three layers.

An example of the materials used in forming a thin ceramic structure is as follows. The form or substrate 11 or 14 is made of refractory molybdenum metal.

Over the molybdenum form is applied a coating of graphite (e.g., Aquadag No. 226, Acheson Colloids Co.) which is rubbed with a soft cloth to remove loose material and burnish its surface. The graphite coated molybdenum form is then coated with a high alumina ceramic such as a 95% $Al_2O_3$-4% $M_gO$-1% $Al(PO_4)_3$ ceramic oxide composition. This coating is preferably applied using an electrophoretic deposition method to obtain a uniform, thin, coherent and adherent deposit. However, it would be possible to apply this layer by dipping, spraying, brushing or any other convenient method. The three layer composite is then heated in a wet hydrogen atmosphere at approximately 1750° C. for sixty minutes. The coatings 13, 16 of ceramic oxide are porous, at least until they have matured. Thus, the wet hydrogen atmosphere comes into contact with the graphite parting layer and reacts therewith to form volatile hydrocarbons such as methane ($CH_4$). When this occurs, the parting layer is completely eliminated and the ceramic is separated from the form and free to shrink and mature until it becomes a dense and impervious free-standing entity.

ALTERNATE EMBODIMENT

Another form of applicants' process is necessary if the ceramic has silica in its composition because silica might be subject to reduction at high temperatures. In this situation, the three layer composite is first heat treated in an ambient argon atmosphere to approximately 1400° C. The graphite layer 12, 15 is held together by a volatile resin or other organic binder, therefore, during this heating the graphite layer breaks down and the ceramic is loosened from the substrate, but the graphite still remains. The graphite can then be removed if desired by separating the ceramic from the metal form and heating it in a reducing or oxidizing atmosphere. However, the first example of applicants' process is preferable since it is more direct and there is less handling of the thin walled ceramic and, therefore, less chance of breakage.

Examples of other ceramics which can be prepared by using a wet hydrogen reducing atmosphere and a graphite parting layer include but are not limited to stabilized and unstabilized zirconia, thoria, hafnia and zircon. The process is also applicable to refractory intermetallic compounds such as the borides, silicides, carbides, nitrides and beryllides which will not react with carbon at their sintering temperature.

Obviously many modifications and variations of the present invention are possible in the light of the above teachings.

What is claimed is:
1. A process for the manufacture of thin walled articles comprising:
   applying a graphite parting layer to a refractory form;
   applying a layer of refractory ceramic material to said form on top of said graphite parting layer to make a three layer composite, said graphite parting layer being non-reactive with said form and said material, said material further being non-reactive with said form and having a sintering temperature below the decomposition temperature of said form; and
   heating said composite to at least the sintering temperature of said material in an atmosphere of wet hydrogen which will react with and completely eliminate said graphite parting layer during sintering of said material which is free to shrink and mature to a free-standing entity.
2. The process of claim 1 wherein said layer of material is applied by electrophoretic deposition.
3. The process of claim 1 wherein said parting layer is electrically conductive and said layer of material is applied by electrophoretic deposition.
4. The process of claim 1 wherein said material comprises a high alumina ceramic such as a 95% $Al_2O_3$=4% MgO=1% $Al(PO_4)_3$ ceramic oxide composition.
5. The process of claim 1 wherein said parting layer is electrically conductive graphite; and
   said layer of material is a high alumina ceramic such as a 95% $Al_2O_3$=4% MgO=1% $Al(PO_4)_3$ composition and is applied by electrophoretic deposition.

References Cited

UNITED STATES PATENTS

| | | | |
|---|---|---|---|
| 2,974,388 | 3/1961 | Ault | 264—59 |
| 3,016,597 | 1/1962 | Denes | 264—159 |
| 3,016,598 | 1/1962 | Anderson et al. | 264—63 |
| 3,050,813 | 8/1962 | Kniveton | 264—59 |
| 3,223,607 | 12/1965 | Millner et al. | 204—181 |
| 3,396,220 | 8/1968 | Dewsnap et al. | 264—67 |
| 3,404,079 | 10/1968 | Boardman | 201—181 |

OTHER REFERENCES

E. Wertheim: Organic Chemistry, 2nd ed., 1945, The Blakiston Company, Philadelphia, Pa., p. 26.

DONALD J. ARNOLD, Primary Examiner

J. H. MILLER, Assistant Examiner

U.S. Cl. X.R.

204—181; 264—57, 65, 82